United States Patent
Liu et al.

(10) Patent No.: US 9,266,352 B2
(45) Date of Patent: Feb. 23, 2016

(54) SYSTEM AND METHOD FOR LENTICULAR IMAGE PRINTING AND PRINT MEDIA

(71) Applicant: Xerox Corporation, Norwalk, CT (US)

(72) Inventors: Chu-heng Liu, Penfield, NY (US); David Allen Mantell, Rochester, NY (US); Jing Zhou, Rochester, NY (US); Eli Berkley Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 102 days.

(21) Appl. No.: 13/974,765

(22) Filed: Aug. 23, 2013

(65) Prior Publication Data
US 2015/0056419 A1   Feb. 26, 2015

(51) Int. Cl.
| | |
|---|---|
| B41J 2/15 | (2006.01) |
| B41J 2/145 | (2006.01) |
| B41J 2/18 | (2006.01) |
| B41J 3/407 | (2006.01) |
| B41M 5/00 | (2006.01) |
| B41J 11/00 | (2006.01) |

(52) U.S. Cl.
CPC ............. *B41J 3/407* (2013.01); *B41M 5/0047* (2013.01); *B41M 5/0064* (2013.01); *B41J 11/002* (2013.01); *Y10T 428/24802* (2015.01)

(58) Field of Classification Search
USPC ................. 347/13, 40, 41, 74, 100, 105, 107; 359/455, 463, 619, 621; 396/306, 327, 396/330
See application file for complete search history.

(56) References Cited

U.S. PATENT DOCUMENTS

| | | | |
|---|---|---|---|
| 6,839,178 B2 * | 1/2005 | Uchiyama et al. | 359/620 |
| 6,995,914 B1 | 2/2006 | Conley et al. | |
| 8,035,897 B2 | 10/2011 | Spiro | |
| 8,203,790 B2 | 6/2012 | Booyens et al. | |
| 8,256,888 B2 | 9/2012 | Horn | |
| 8,416,499 B2 | 4/2013 | Liu et al. | |
| 8,851,658 B2 * | 10/2014 | Yamamoto et al. | 347/102 |
| 2006/0066879 A1 | 3/2006 | Bast et al. | |
| 2006/0285215 A1 | 12/2006 | Wu | |

FOREIGN PATENT DOCUMENTS

WO   WO 2013048615 A1 *   4/2013   ............. G02B 27/22

* cited by examiner

*Primary Examiner* — Hai C Pham
(74) *Attorney, Agent, or Firm* — Maginot Moore & Beck LLP (57) ABSTRACT

A method of forming a lenticle on a substrate includes operating a plurality of inkjets to eject a plurality of ink drops of an optically transparent ink onto a surface of a substrate between a first printed line of an optically opaque ink and a second printed line of the optically opaque ink to form a lenticle from the optically transparent ink, the first printed line being formed substantially parallel to the second printed line with a separation between the first printed line and the second printed line corresponding to a predetermined width of a lenticle to be formed on the substrate.

5 Claims, 6 Drawing Sheets

SYSTEM AND METHOD FOR LENTICULAR IMAGE PRINTING AND PRINT MEDIA

TECHNICAL FIELD

This disclosure relates generally to printing systems that form lenticular printed images and, more particularly, to systems and processes for forming lenticles using a printer.

BACKGROUND

Lenticular printing is used to provide an illusion of depth or animation to a two-dimensional printed image. Many existing lenticular printed media include an interleaved printed image with an array of lenticles placed over the interleaved printed image. The interleaved printed image is formed from a series of thin sections of two or more printed images that are formed in an alternating pattern on a print medium such as a sheet of paper. The lenticles are formed from an optically transparent material, such as a sheet of plastic, with a repeating lens-like structure that is aligned with the interleaved printed image. The lenticles focus light that reaches the interleaved image so that a viewer sees only a portion of the interleaved image when viewing the lenticular print medium from different viewing angles. In a simplified example, an interleaved image comprises alternating strips of blue and red ink that are aligned with a series of lenticles. The lenticles direct light rays from a first angle to the blue strips so that the image appears to be blue when viewed from the first angle. The lenticles direct light rays from a second angle to the red strips so that the image appears to be red when viewed from the second angle. As is known in the art, a lenticular printed medium provides an illusion of three-dimensional depth, transformation, or animation to multiple interleaved images as the viewing angle of the printed medium changes.

In many embodiments, the lenticles in a lenticular printed medium are formed from an optically transparent plastic sheet. The lenticles are formed using, for example, an ablation, molding, or an extrusion process that produces a series of lenticles in the plastic sheet. The plastic sheet is then aligned with the interleaved printed image to form the lenticular printed medium. Conventional lenticular printed images require comparatively thick plastic sheets that are formed with comparatively wide lenticles due to the physical tolerances of the plastic sheets that form the lenticles. Narrower lenticles enable printing interleaved images with narrower interleaved strips for lenticular images with higher resolution and visual fidelity.

More recently, techniques for generating a lenticular printed medium using inkjet printing have enabled the production of lenticular printed images using thinner print media with narrower lenticles that enable the production of higher resolution printed images. In one configuration, an inkjet printer ejects drops of an optically transparent ink onto the surface of thin transparent plastic sheet to form lenticles on one surface of the plastic sheet. The interleaved image is placed on the opposite side of the plastic sheet in alignment with the printed lenticles to form the lenticulated print. The use of a transparent ink to form the lenticles enables the production of substantially narrower lenticles than are practical with conventional plastic sheets, and the printed lenticles can be formed on transparent plastic sheets having thicknesses that are similar to ordinary printed paper instead of the much thicker plastic sheets used for conventional lenticulated print media.

Figure 4A:
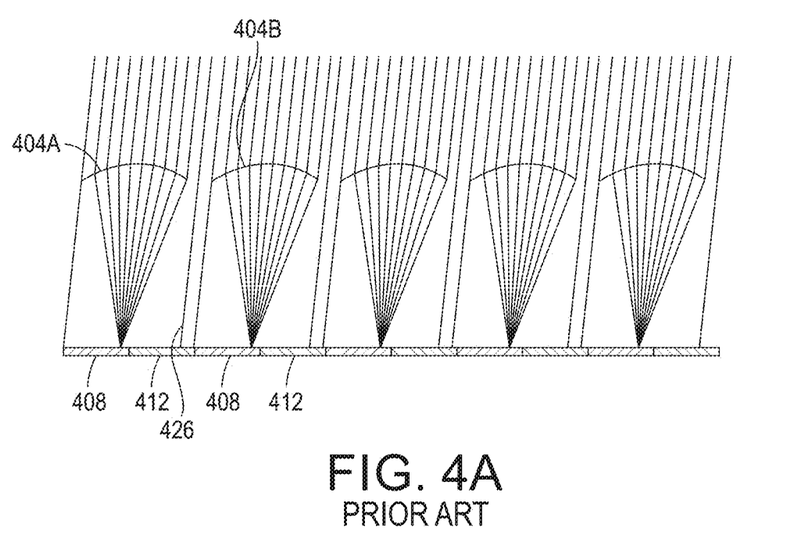
FIG. 4A is a diagram of a prior art lenticles that are separated from one another on a surface of an optically transparent substrate.
Figure 4B:
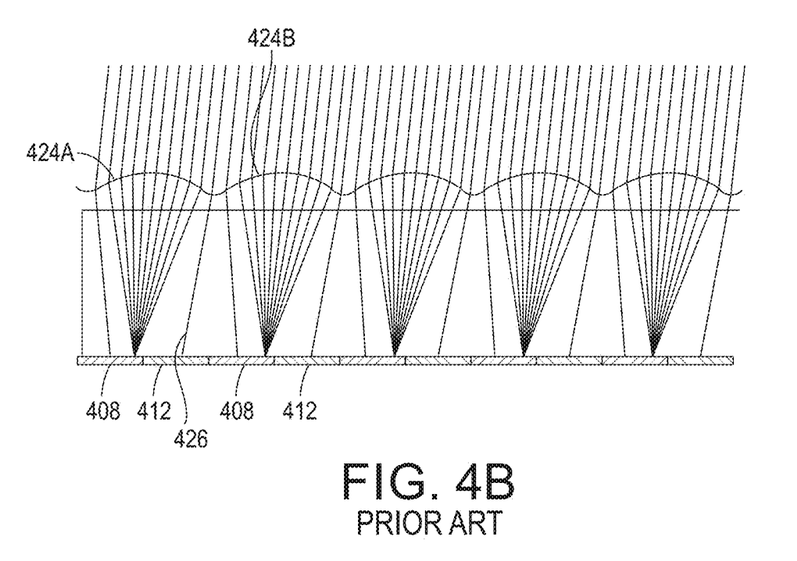
FIG. 4B is a diagram of a prior art lenticles that overlap each other on a surface of an optically transparent substrate.

One challenge that confronts lenticulated print media that are formed with inkjet printers is the potential for gaps or overlap between the printed lenticles that alter the focus of light that reaches the interleaved image. For example, FIG. 4A depicts prior art lenticles, such as lenticles 404A and 404B, that are formed with a gap between adjacent lenticles. The lenticles 404A and 404B are configured to focus light from different angles onto either of the interleaved images 408 or 412. In FIG. 4A, the lenticles 404A and 404B focus the illustrated light rays onto the interleaved image 408. In FIG. 4A, however, a gap formed between the lenticles 404A and 404B permits a portion of the light, such as the light ray 416, to be reflected from the interleaved image 412 instead of the interleaved image 408. FIG. 4B depicts another configuration where lenticles, such as lenticles 424A and 424B overlap each other. In FIG. 4B, the overlap between the lenticles diverts the focus for a portion of the light rays from the first interleaved image 408 to the second interleaved image 412. For example, the light ray 426 intersects an overlapping region between the lenticles 424A and 424B, and the overlapped transparent ink removes the focusing effect of either lenticle to enable the light ray 426 to reach the interleaved image 412 instead of the interleaved image 408. Consequently, systems and processes for forming lenticulated print media with lenticles that focus light with improved precision would be beneficial.

SUMMARY

In one embodiment, a method of operating an inkjet printer to form a lenticle on a substrate has been developed. The method includes operating a plurality of inkjets to eject a plurality of ink drops of an optically transparent ink onto a surface of a substrate between a first printed line of an optically opaque ink and a second printed line of the optically opaque ink to form a lenticle from the optically transparent ink, the first printed line being formed substantially parallel to the second printed line with a separation between the first printed line and the second printed line corresponding to a predetermined width of a lenticle to be formed on the substrate.

In another embodiment, an inkjet printer that is configured to form printed lenticles on a substrate has been developed. The printer includes a plurality of inkjets arranged in a print zone and configured to eject ink drops onto a surface of a print medium and a controller operatively connected to the plurality of inkjets. The controller is configured to operate the plurality of inkjets to eject a plurality of ink drops of an optically transparent ink onto the surface of the print medium between a first printed line formed from an optically opaque ink and a second printed line formed from the optically opaque ink to form a lenticle on the surface of the print medium, the first printed line and the second printed being arranged substantially parallel to each other with a predetermined separation between the first printed line and the second printed line corresponding to a width of the lenticle.

In another embodiment, a print medium with lenticles has been developed. The print medium includes a substrate having a first side and a second side and the substrate substantially comprising an optically transparent material. The print medium also includes a first printed line formed on the first side of the substrate with an optically opaque ink, a second printed line formed on the first side of the substrate with the optically opaque ink, the second printed line being formed substantially parallel to the first printed line, and a lenticle formed from an optically transparent ink on the first side of the substrate between the first printed line and the second printed line, the lenticle being formed with a shape to focus light that is directed to the first side of the substrate to a plurality of locations on the second side of the substrate.

BRIEF DESCRIPTION OF THE DRAWINGS

The foregoing aspects and other features of a printer that forms lenticles on a surface of a substrate are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals have been used throughout to designate like elements. As used herein, the term "printer" encompasses any apparatus that produces images with colorants on media, such as digital copiers, bookmaking machines, facsimile machines, multi-function machines, etc.

As used herein, the term "interleaved image" refers to a printed image that is formed from a combination of two or more original images that are segmented into a plurality of strips and combined into a single image that includes alternating strips from the original images. In a simplified example, an interleaved image of a red square and a blue square is formed from a series of red and blue slices. In a lenticular print medium, light from a particular angle is focuses on strips in the interleaved image corresponding to one of the original images and a viewer sees the original image. As the view angle changes, such as due to movement of the viewer or the lenticulated print, the light is reflected from different slices in the interleaved image. For example, in the example given above, a viewer perceives a red square from one viewing angle and a blue square from another viewing angle of the lenticulated print. A variety of interleaved printed images in a lenticulated print provides an illusion of depth, motion, or transformation of an object as the lenticulated print is viewed from a range of angles.

As used herein, the term "lenticle" refers to a structure formed from a material that focuses light in a manner similar to a lens for viewing a portion of an interleaved printed image.

In some embodiments, a lenticle is formed with an elongated shape extending along an axis of an interleaved printed image in parallel with the interleaved image slices. A series of lenticles formed in parallel are aligned with the interleaved image with one lenticle being aligned with each set of slices in the interleaved image. The lenticle is formed with a convex curved upper surface that focuses light from different directions on different image slices of the interleaved image to enable viewing of different slices in the interleaved image from different angles with respect to the lenticle. A lenticular printed medium typically includes multiple lenticles that are arranged in parallel to each other. The lenticle is formed from an optically transparent material, which is to say that the material enables light to pass through the lenticle to enable viewing of different portions of an interleaved image that is aligned with the lenticle. In some embodiments, the lenticle is formed from an optically transparent material with a color tint or translucency property.

As used herein, the term "process direction" refers to a direction of movement of a substrate, such as a print medium, past printheads in a print zone. As used herein, the terms "cross-process direction" or "cross-process axis" refer to a direction across the surface of the print medium that is perpendicular to the process direction.

Figure 5:
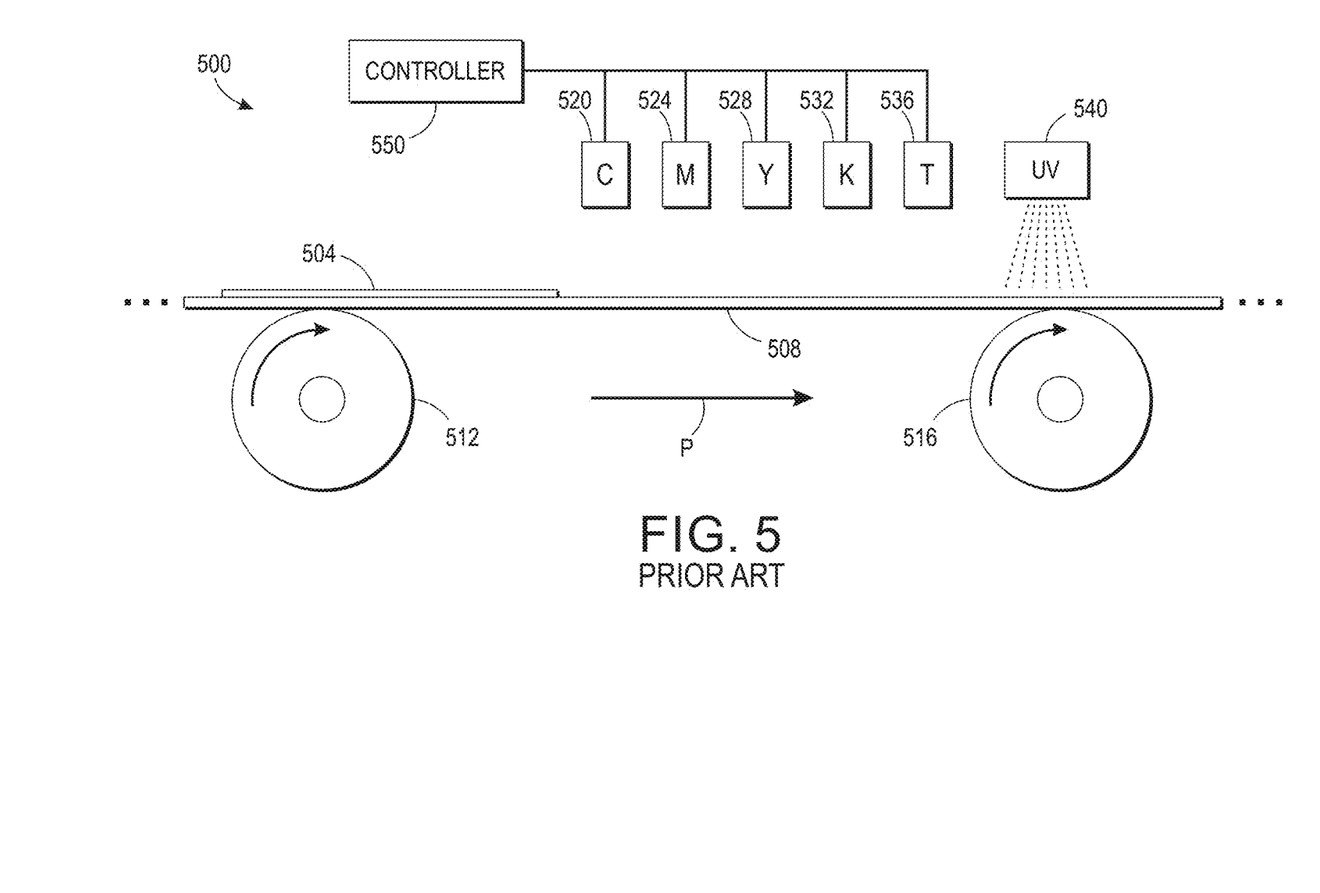
FIG. 5 is a diagram of a prior art inkjet printer that can be configured to form printed lenticles on a substrate using an optically transparent ink.

FIG. 5 depicts a prior art inkjet printer that can be configured to form printed lenticles on a substrate. The printer 500 includes a media transport with rollers 512 and 516 that propel a belt 508 in a process direction P through a print zone that includes a cyan ink printhead unit 520, magenta ink printhead unit 524, yellow ink printhead unit 528, and black ink printhead unit 532 to enable CMYK color printing. The print zone also includes a transparent ink printhead unit 536 that is configured to eject ink drops of an optically transparent ink. In the embodiment of FIG. 5, an ultraviolet (UV) light source 540 is positioned along the media transport in the process direction P after the print zone to apply ultraviolet light to printed ink that is formed on a print substrate. FIG. 5 depicts an illustrative print substrate 504, which is embodied as a media sheet formed from an optically transparent polymer substrate. The belt 508 carries the media sheet 504 past the printhead units 520-536 and the UV light source 540 to receive printed images and printed lenticular structures during a printing operation. In one embodiment, the printer 500 includes a duplexed media path (not shown) that passes the media sheet 504 through the print zone more than one time for printing on a first side and a second side of the media sheet 504. In an alternative embodiment, another printing device forms the interleaved printed images on one side of the substrate 504 and the other printing device optionally forms the opaque printed lines, such as the printed lines 204A and 204B, on the side of the substrate that receives the transparent ink in the example of FIG. 5.

In the printer 500, a digital controller 550 controls the operation of inkjets in the printhead units 520-536 to print images and patterns on a surface of the substrate 504. The controller 550 includes one or more memory data storage devices that store programmed instructions for operation of the controller. The memory devices optionally store digital image data corresponding to predetermined patterns of optically opaque lines and optically transparent lenticles to form on a surface of a substrate and interleaved image data to be formed on an opposing surface of the substrate. As described in more detail below, in one configuration the controller 550 operates inkjets in one or more of the CMYK inks to form parallel printed lines on the surface of the substrate. The controller 550 also ejects ink drops of the transparent ink from the transparent printhead unit 536 to form a pattern of lenticles where each lenticle is formed between two of the parallel printed lines on the surface of the substrate 504.

In one embodiment, the printer 500 forms printed images using a phase-change ink. As used herein, the term "phase change ink" refers to any form of ink that is substantially solid at room temperature and liquefies at an elevated operating temperature during an image formation operation. For example, in the printer 500 the printhead units 520-536 include heaters that elevate a solid or gelatinous ink to a temperature at which the ink liquefies. The inkjets in the printhead units 520-536 eject drops of the liquefied ink onto the surface of the media sheet 504. The liquefied ink returns to a solid or gelatinous state on the media sheet 504 after the printing operation. In one embodiment, the phase-change ink is a gelatinous ("gel") ink that is a high viscosity semi-solid at room temperature and liquefies to a lower viscosity for inkjet printing at an elevated operating temperature of the printer 500. Some forms of gel ink are ultraviolet (UV) curable, which is to say that the liquefied ink returns to a solid state in response to exposure to UV radiation. The process of solidifying ink on the surface of the print substrate is also referred to as an ink fixation process. As described in more detail below, the printer 500 ejects ink drops to form printed lines and lenticle structures on the surface of the print medium 504, and the UV light that is emitted from the UV light source 540 solidifies the liquefied ink into a durable form that retains the shape of the lenticle.

Figure 1:
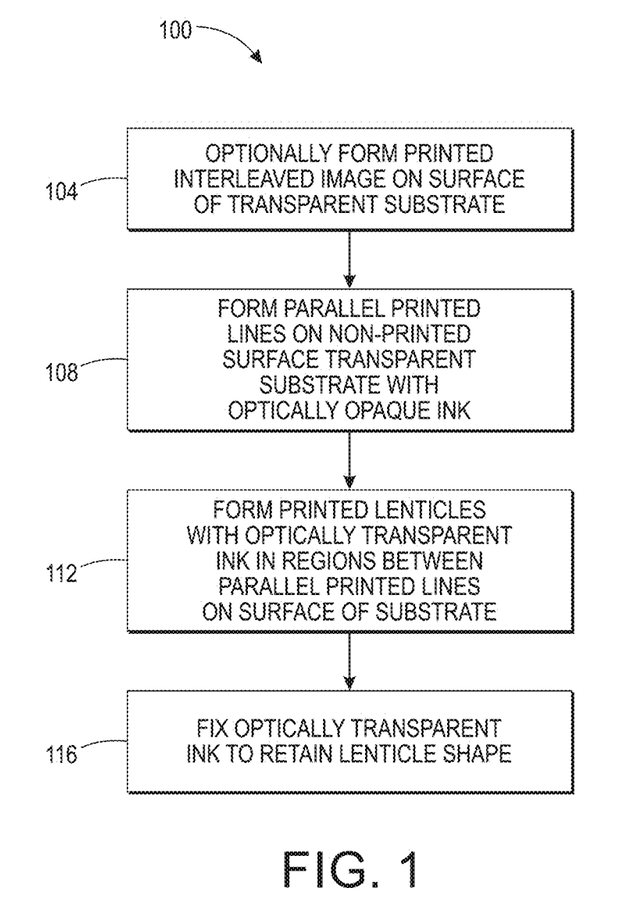
FIG. 1 is a block diagram of process for forming lenticles on a surface of a substrate with a printer.

FIG. 1 depicts a process 100 for producing printed lenticles on an optically transparent substrate. In the description below, a reference to the process 100 performing an action or function refers to the operation of a controller, such as the controller 550 in the printer 500, which performs stored program instructions to operate one or more components in a printer to perform the function or action. Process 100 is described with reference to the printer 500 of FIG. 5 for illustrative purposes.

Process 100 begins with an optional printing process to form an interleaved printed image on one side of a transparent substrate, such as a print medium (block 104). In the printer 500, the transparent polymer sheet 504 is a printing substrate with two surfaces that receive ink from the printheads 520-536. The controller 550 receives digital image data corresponding to an interleaved image. In one embodiment, the interleaved image data are generated using image processing techniques that are known to the art to combine two or more images into an interleaved image. The controller 550 operates inkjets in the CMYK printhead units 520-532 to form the interleaved printed image on one surface of the transparent sheet 504. In one configuration, the slices that form the interleaved image are arranged in parallel to the process direction P. In the printer 500 a duplexed media path (not shown) returns the media sheet 504 to the print zone for formation of the lenticles on the surface of the media sheet 504 that is opposite the printed image, as described in more detail below.

The process of forming the interleaved image on the media sheet 504 is optional. In another embodiment, the printer 500 forms lenticles on a surface of an optically transparent substrate, such as the sheet 504, without printing on the second side of the substrate. After formation of the lenticle structures on the media sheet 504, the media sheet is supplied to another printer for printing on the surface of the media sheet 504 opposite the lenticles. In another configuration, another print medium with an interleaved printed pattern is affixed to the surface of the media sheet 504 in alignment with the lenticles to form a lenticulated printed image.

Process 100 continues as the printer 500 forms a series of parallel printed lines with an optically opaque ink on a surface of the transparent substrate (block 108). In the printer 500, the controller 550 operates inkjets in one or more of the CMYK printhead units 520-532 to form the parallel printed lines. In one embodiment, the controller 550 operates inkjets in the black ink printhead unit 532 to form printed lines of black ink on the surface of the transparent medium 504. In one embodiment, the printer 500 forms the printed lines in parallel with the process direction P. The controller 550 operates a single inkjet to form each of the parallel lines with an ink drop density of six-hundred drops per inch (DPI) in the process direction P. The printer 550 forms the printed lines with predetermined spaces that correspond to a selected width of each lenticle. For example, in one configuration the printer 550 forms the printed lines with approximately 100 μm of separation between each pair of printed lines.

Figure 2A:
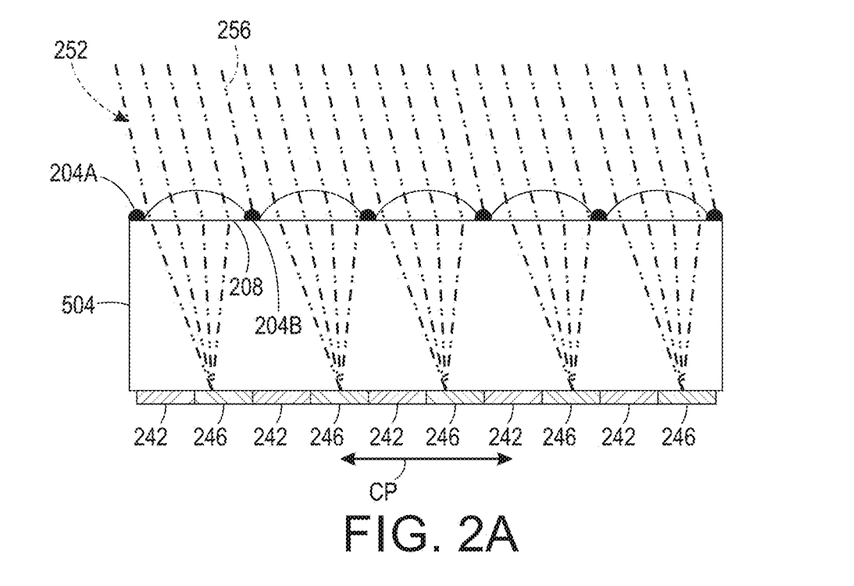
FIG. 2A is a profile view of lines of printed optically opaque ink and printed lenticles of an optically transparent ink formed on a surface of an optically transparent substrate with light rays intersecting the substrate at a first angle.
Figure 2B:
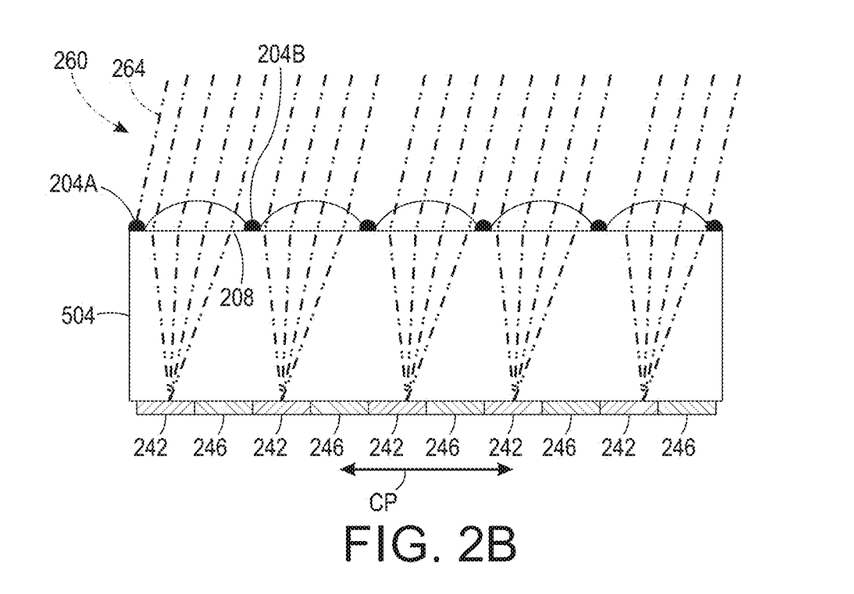
FIG. 2B is a profile view of the optically opaque ink lines, optically transparent lenticles, and substrate of FIG. 2A with light rays intersecting the substrate from a second angle.
Figure 3:
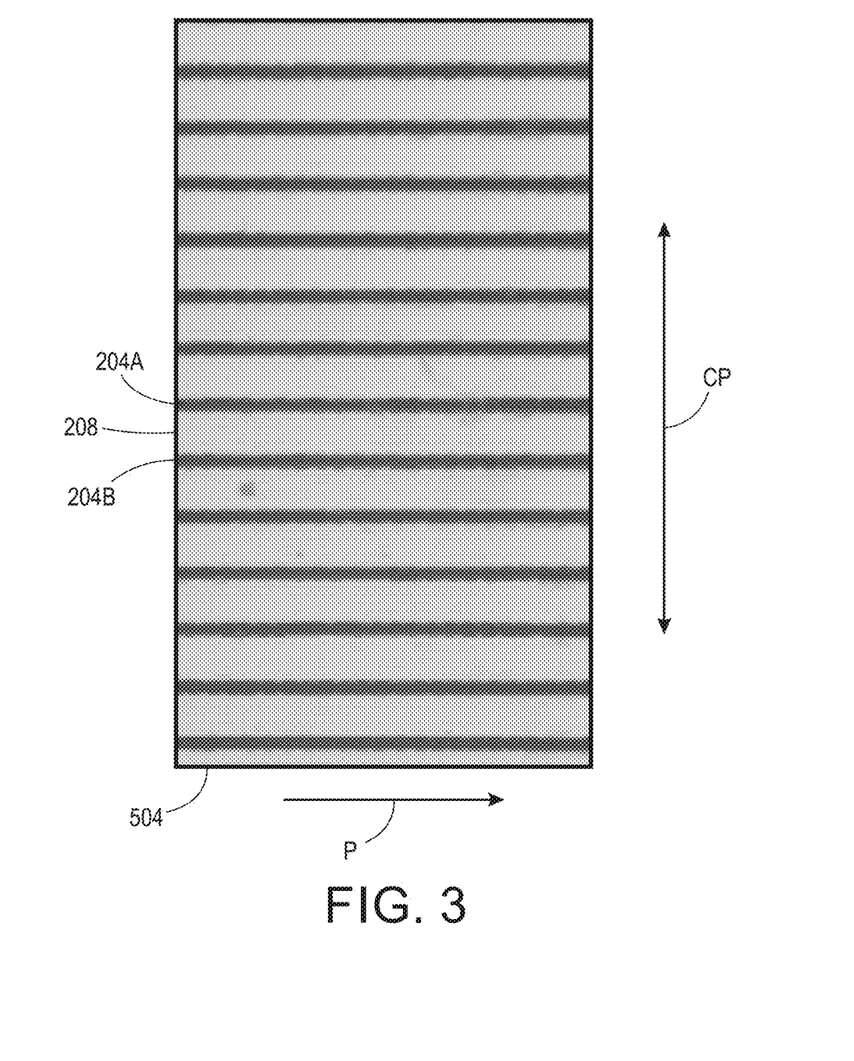
FIG. 3 is a plan view of the printed lines of the optically opaque ink and printed lenticles of FIG. 2A and FIG. 2B formed on a surface of a substrate.

The optically opaque ink that forms the printed lines on the transparent substrate extends upwardly from the substrate to a predetermined height. FIG. 2A and FIG. 2B depict a profile view of the transparent substrate 504 taken along the cross-process axis CP with a series of printed lines of the optically opaque ink including the printed lines 204A and 204B. As described in more detail below, a series of lenticles are formed between the printed lines of optically opaque ink, such as the lenticle 208 that is formed between the printed lines 204A and 204B. FIG. 3 depicts a plan view of the printed lines, including the printed lines 204A and 204B, and lenticles, including the lenticle 208, on a portion of the substrate 504.

In FIG. 2A and FIG. 2B, the printed lines 204A and 204B extend upwardly from the surface of the transparent substrate 504 to form a barrier around the region that includes the printed lenticle 208. In the embodiment of the printer 500, the printed lines 204A and 204B are formed from a phase-change ink such as a UV curable gel ink. In one embodiment of the process 100, the printed lines of the opaque ink are exposed to the UV light source 540 before the lenticles are formed on the surface of the substrate to cure the printed lines. The printed lines of ink solidify due to exposure to the UV light source. In one embodiment, the printer 500 performs a multi-pass printing process to fix the printed lines prior to forming the printed lenticles.

Referring again to FIG. 1, process 100 continues as the printer 500 ejects drops of an optically transparent ink onto regions of the surface of the substrate between the printed lines of optically opaque ink to form printed lenticles (block 112). In one configuration, the controller 550 operates inkjets in the transparent ink printhead unit 536 to fill the regions between the printed lines with the transparent ink. In another configuration, the optical properties of a colored ink may enable the printer 500 to use the ink to form lenticles. For example, in some embodiments the yellow ink printhead unit 528 ejects a yellow ink that is sufficiently transparent to optical light for use in forming printed lenticles.

The controller 550 is configured to print the optically transparent ink with a sufficient density to cover the surface of the substrate 504 in the regions between the printed lines of opaque ink completely and to form a curved upper surface that extends from the surface of the substrate 504 to form a lens. The density of the optically transparent ink is higher than the density of the optically opaque ink in the printed lines. As the optically transparent ink fills the region between the printed lines, the edges of the lenticles formed by the optically transparent ink contact the printed lines that form barriers on either side of each lenticle. For example, FIG. 2A and FIG. 2B, depict the lenticle 208 that includes transparent ink with a sufficient density to completely fill the surface of the substrate 504 between the printed lines 204A and 204B. The lenticle 208 also extends upwards with a curved shape to a height above the surface of the substrate 504 that exceeds the heights of the printed lines 204A and 204B. Surface tension in the optically transparent ink holds the printed lenticle to the region between the printed lines 204A and 204B and enables the lenticle to form with a convex curved surface. The printed lines 204A and 204B act as channel barriers to maintain the form of the lenticle 208.

In the printed lenticle pattern, the printed lines of opaque ink maintain separation between adjacent printed lenticles and enable the transparent ink that forms the lenticle to form a curved lens shape between each set of printed lines. The controller 550 increases or decreases the density of transparent ink that is used to form each lenticle to increase or decrease, respectively, the curvature of each printed lenticle. As is known in the art, the curvature of the lenticle adjusts the focal length and focusing properties of the lens formed by each lenticle.

Referring again to FIG. 1, process 100 continues as the printer 500 fixes the optically transparent ink that forms the printed lenticles with the UV light source 540 (block 116). The UV light from the UV light source 540 enables the optically transparent ink forming each of the lenticles to transition from a liquid state to a solid state while retaining the curved shape depicted in FIG. 2A and FIG. 2B. In one embodiment of the process 100, the media sheet 504 forms a lenticulated printed image with the interleaved printed image printed on one side of the media sheet 504 and the lenticles with the optically opaque ink lines printed on the other side of the media sheet 504. In another embodiment, one side of the media sheet 504 includes the lenticles and the printed lines of optically opaque ink, while the second side forms a surface that can receive a printed image from another printer or can be affixed to a separate print medium to form a lenticulated image.

Referring to FIG. 2A, after completion of the process 100, a first side of the media sheet 504 includes the printed lines of optically opaque ink, such as the printed lines 204A and 204B, and the printed lenticles, such as lenticle 208, that are formed from the optically transparent ink. In the embodiment of FIG. 2A, an interleaved image is printed on a second side of the media sheet 504. The interleaved image in FIG. 2A includes alternating slices of a first image 242 and a second image 246. The slices are arranged in parallel to the lenticles 208 to enable each lenticle to focus light onto the slices for each of the portions of the interleaved image. While the interleaved image slices 242 and 246 are depicted as being printed on the media sheet 504 in FIG. 2A, in another embodiment the interleaved image is formed on another print medium that is affixed to the media sheet 504 through, for example, an adhesive backing.

FIG. 2A depicts illustrative light rays 252 that pass through the lenticles and are focused onto the strips 246 for one portion of the interleaved image. In FIG. 2A, the lenticles focus the light rays 252 that intersect the media sheet 504 at a first angle onto the slices 246 to enable viewing of the portion of the interleaved image corresponding to the slices 246 from the first angle. In FIG. 2, some light rays intersect the optically opaque printed lines, such as the light ray 256 that intersects the printed line 204B. The optically opaque printed lines block light from reaching the interleaved image through the transparent media sheet 504. Thus, a viewer only sees reflected light rays that pass through the optically transparent lenticles and are focused onto a selected portion of the interleaved image. The opaque printed lines ensure that the lenticles are formed in a shape that focuses light onto a selected portion of the interleaved image, and the opaque printed lines enable the printer to form the lenticles with the selected curvature and focus.

FIG. 2B depicts the media sheet 504 of FIG. 2A including the printed lines of optically opaque ink, lenticles formed from transparent ink, and the interleaved image. In FIG. 2B, light rays 260 intersect the media sheet 504 from a different angle than the light rays that are depicted in FIG. 2A. In FIG. 2B, the lenticles focus the light rays 260 onto the interleaved image slices 242. The optically opaque printed lines block light rays that intersect the media sheet at locations between the printed lenticles, such as the printed line 204A that blocks the light ray 264. While FIG. 2A and FIG. 2B are depicted as separate illustrations for clarity, in use the lenticular print often receives illumination from many angles simultaneously. Thus, one observer views the image slices 246 from the angle depicted in FIG. 2A while a second observer views the image slices 242 from the angle depicted in FIG. 2B simultaneously.

Figure 2C:
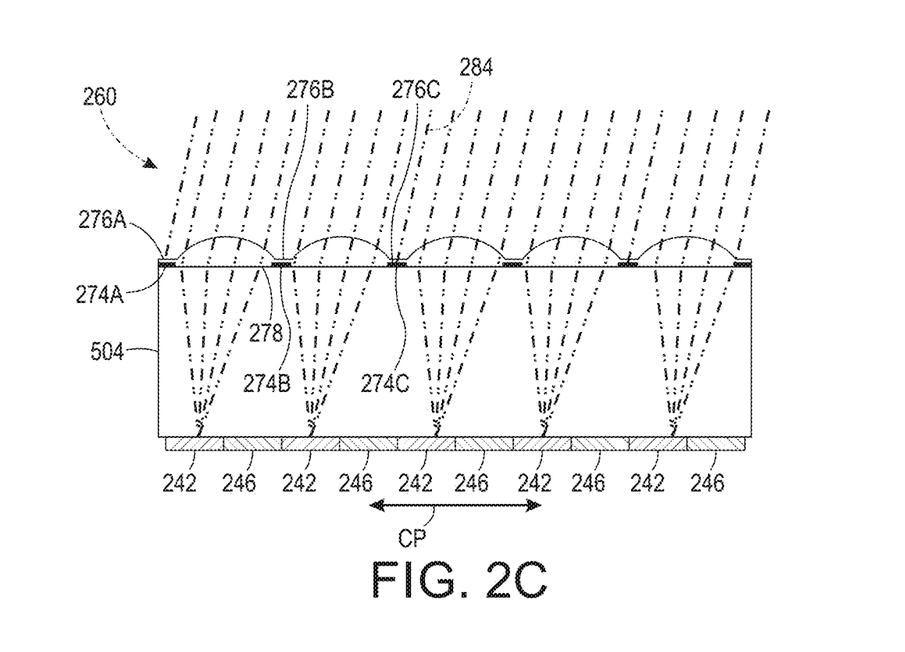
FIG. 2C is a profile view of another embodiment of lines of printed optically opaque ink and printed lenticles of an optically transparent ink formed on a surface of an optically transparent substrate.

FIG. 2C depicts another configuration of a media sheet with printed lenticles. FIG. 2C depicts the transparent substrate 504 with printed lines of an optically opaque ink, such as the printed lines 274A, 274B, and 274C with printed lenticles, such as the lenticle 278, that are formed from an optically transparent ink. In FIG. 2C, the printed lines of opaque ink 274A and 274B are formed with minimal height above the transparent substrate 504. Aqueous and solvent based inks are examples of inks that are printed in patterns that have a low height above the surface of the substrate 504 in comparison to gel or other phase change inks. In some embodiments, a printing process such as dye sublimation embeds ink or another colorant within the transparent substrate 504 where the opaque lines have effectively zero height above the substrate. In the configuration of FIG. 2C, the transparent ink in the printed lenticles covers the opaque printed lines. For example, the portions of the transparent ink 276A, 276B and 276C, cover the opaque ink from the printed lines 274A, 274B, and 274C, respectively. While the optically transparent ink extends past the width of the lenticles in FIG. 2C, the printed lines of the optically opaque ink still block light from reaching incorrect portions of the interleaved printed images 242 and 246. For example, FIG. 2C depicts a light ray 284 intersecting the optically transparent ink 276C that is formed between two printed lenticles. The opaque ink in the printed line 274C that is formed underneath the optically transparent ink 276C prevents the light ray 284 from reaching a portion of the interleaved image 246 instead of the interleaved image 242.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printer comprising:
a plurality of inkjets arranged in a print zone and configured to eject ink drops onto a surface of a print medium; and
a controller operatively connected to the plurality of inkjets, the controller being configured to:
operate the plurality of inkjets to form a first printed line and a second printed line with an optically opaque ink on the surface of the print medium, the first printed line and the second printed line being arranged substantially parallel to each other with a predetermined separation between the first printed line and the second printed line, and the first printed line and the second printed line having substantially zero height above the surface of the print medium; and operate the plurality of inkjets to eject a plurality of ink drops of an optically transparent ink onto the surface of the print medium between the first printed line and the second printed line to form a lenticle on the surface of the print medium, the lenticle being formed with a width corresponding to the predetermined separation between the first printed line and the second printed line.

2. The printer of claim 1, the controller being further configured to:

operate the plurality of inkjets to eject a plurality of drops of the optically transparent ink to enable the lenticle to cover the surface of the print medium between the first printed line and the second printed line and to cover at least a portion of the surface of the print medium over the first printed line and the second printed line.

3. The printer of claim 1 further comprising:

an ultraviolet light source; and the plurality of inkjets being configured to form the lenticle with an ultraviolet curable ink and the ultraviolet light source being configured to apply ultraviolet light to the ultraviolet curable ink forming the lenticle to solidify the ultraviolet curable ink in a shape that enables the lenticle to focus light on a surface of the print medium.

4. The printer of claim 1, the controller being further configured to:

operate the plurality of inkjets to form an interleaved printed image on another surface of the print medium for the lenticle to focus light from a first direction onto a first portion of the interleaved printed image and focus light from a second direction onto a second portion of the interleaved printed image to enable viewing of only the first portion of the interleaved image from the first direction and to enable viewing of only the second portion of the interleaved image from the second direction.

5. The printer of claim 4 wherein the plurality of inkjets form the interleaved image on the other surface of the print medium prior to forming the first printed line, second printed line, and lenticle.

* * * * *